United States Patent [19]
Rich

[11] 3,738,751

[45] June 12, 1973

[54] PORTABLE CONDENSATION NUCLEI METER

[75] Inventor: Theodore A. Rich, Scotia, N.Y.

[73] Assignee: Environment/One Corporation, Schenectady, N.Y.

[22] Filed: July 21, 1970

[21] Appl. No.: 56,834

[52] U.S. Cl. ................................ 356/37, 250/218
[51] Int. Cl. .......................................... G01n 1/00
[58] Field of Search ............... 356/37; 250/218; 73/28, 29

[56] References Cited
UNITED STATES PATENTS

| | | | |
|---|---|---|---|
| 3,463,589 | 8/1969 | Skala | 356/37 |
| 3,037,421 | 6/1962 | Bigelow et al. | 356/37 |
| 2,938,423 | 5/1960 | Rich | 356/37 |

*Primary Examiner*—Ronald L. Wibert
*Assistant Examiner*—F. L. Evans
*Attorney*—Charles W. Helzer

[57] ABSTRACT

A portable condensation nuclei meter mounted in a manually portable housing and including a condensation chamber supported within the housing. A light source and electro-optic detector views the interior of the condensation chamber and derives output pulsed electric signals representative of the production of cloud of liquid droplets produced therein and which in turn are determined by the numbers of condensation nuclei particles entrained in a sample atmosphere. A manually operated pump supported on the housing serves to flush out the condensation chamber and supply it with sample atmospheres at substantially 100 percent relative humidity for each measurement cycle. Manually operable inlet and outlet valves isolate the condensation chamber during an expansion cycle performed intermediate each flushing operation of the pump. Manually actuated expansion cycle apparatus is coupled to the condensation chamber for suddenly expanding the volume of the condensation chamber at a sufficiently rapid rate to supersaturate a trapped specimen of the humidified sample atmosphere and form the cloud of droplets about the condensation nuclei particles as centers of condensation. The number of droplets thus produced being proportional to the number of condensation nuclei particles entrained in the sample atmosphere being monitored. A measure and hold measuring circuit having a linearly calibrated indicating meter is coupled to the electro-optic detector for measuring the value of the output electric signal pulses produced by the electro-optic detector during the instant of each liquid droplet cloud formation with the electric signal pulses being stored in a capacitor for subsequent reading out at a more convenient time with the linearly calibrated indicating meter by a user of the instrument.

11 Claims, 7 Drawing Figures

Inventor
Theodore A. Rich
by Charles W. Helzer
His Attorney

Inventor
Theodore A. Rich
by Charles W. Helzer
His Attorney

PORTABLE CONDENSATION NUCLEI METER

BACKGROUND OF INVENTION

1. Field of Invention

This invention relates to an improved portable condensation nuclei meter.

More particularly, the invention relates to a portable condensation nuclei meter which is compact, light weight, readily transported and manually operated, and which may be battery energized. The improved meter provides a uniform linear scale measurement of the number of small condensation nuclei particles entrained in a sample atmosphere in a manner which permits use of the instrument to perform size measurement in conjunction with additional auxiliary equipment, and includes a measure and hold memory measurement circuit that allows a user of the instrument to make accurate readings of a linearly calibrated meter deflection while he is not otherwise occupied in operating the instrument. Further, the improved meter is comparatively simple in construction and operation and inexpensive to manufacture.

2. Prior Art Problem

A condensation nuclei is an extremely small particle that is sometimes referred to as an aerosol particle, and which is entrained in the air and other gaseous atmospheres often in large numbers. Condensation nuclei particles may range in size from about $10^{-7}$ centimeters in radius to $5 \times 10^{-3}$ centimeters. These particles are produced in the atmosphere in many diverse ways either naturally or by reason of human activity. For example, very fine dust or sand particles stirred up by dust storms and the like become entrained in the air and are transported over great distances. Other sources of condensation nuclei particles are evaporation of ocean water, atmospheric ionization due to naturally occurring radiation, smoke and exhaust from combustion processes and internal combustion engines, evaporation from asphalt pavement and other man-made sources of pollutants of the atmosphere. Due to their extremely small size ranging from microscopic to submicroscopic, condensation nuclei particles are difficult to measure. The usual direct means of measurement using light absorption and light scattering techniques cannot be applied directly to the measurement of condensation nuclei particles. As a result, condensation nuclei meters (hereinafter referred to as CN meters) have been developed which rely on the property of condensation nuclei particles to serve as the nucleus or center of condensation for a water droplet. By causing condensation of water (or other condensible liquid) about the nuclei as centers of condensation their size can be greatly increased thereby allowing the usual techniques of light scattering and/or absorption to be employed in their measurement.

There are a number of known CN meters which depend upon this characteristic feature in their operation. The mechanism involved in the condensation of water about a condensation nuclei as a center of condensation, generally is dependent both on the size of the condensation nuclei, and on the relative humidity of the gaseous atmosphere in which it is entrained. If the relative humidity of a gaseous sample having condensation nuclei particles entrained therein tends to rise above 100 percent, such as would occur by sudden cooling of the atmosphere, condensation starts the deposition of water on the nuclei particles as centers of condensation in order to achieve an equilibrium condition. The deposition of water will continue until the humidity is lowered to the new equilibrium condition representing substantially 100 percent relative humidity for the new, cooler temperature. The number of droplets thus formed will of course be determined by the number of particles entrained in the sample atmosphere. Hence the number and size of a cloud of water droplets, and accordingly the light scattering and/or absorption characteristics of the cloud, will be determined by the number of particles present.

For a more detailed description of one known form of CN meter using the above principles, reference is made to U.S. Pat. No. 2,684,008 issued July 20, 1954. The CN meter described in this patent comprises an expansion chamber, which is adapted to hold air or other gaseous samples containing CN particles to be monitored with the expansion chamber being traversed by a light beam from a light source that normally is allowed to impinge upon an electro-optical detector such as photocell. Input and output conduits to the expansion chamber are controlled by synchronously operated valves which permit a controlled expansion cycle. Following the periodic or cyclical introduction of a specimen of a sample gaseous atmosphere into the expansion chamber, a pressure difference is suddenly established by rapidly expanding the volume of the expansion chamber with an expansion valve apparatus. In this manner, a very rapid or sudden expansion of the gaseous sample is achieved whereby precise control of the level of supersaturation of the gaseous sample is attained (which previously has been passed through a humidifier to achieve substantially 100 percent relative humidity). As a result small water droplets are formed about the condensation nuclei particles as centers, and a count is obtained of the resulting magnified condensation nuclei particles through the electro-optic detecting device that derives a pulsed electric output signal representative of the number of condensation nuclei particles. While this known CN meter is satisfactory for many purposes it is not readily transportable or easily used in a large number of measurement situations. While portable CN meters have been available in the past, they have not proven entirely satisfactory for a variety of reasons. One known portable CN meter uses a single, non-linearly calibrated output indicating instrument which makes interpolation between the calibration markings difficult and requires the use of ancillary interpolation charts and graphs. Because of this characteristic the instrument is virtually impossible to use for particle size determination measurement purposes. Further, the instrument must be pumped or otherwise worked to a predetermined pressure or vacuum, and reading of the output indicating meter must take place at substantially the same time as the sample expansion. Hence, an operator of the instrument must be experienced and able to perform several tasks almost simultaneously. To overcome these problems, the present invention was devised.

SUMMARY OF INVENTION

It is therefore a primary object of the present invention to provide a new and improved, portable CN meter which is easily transported and operated by a single operator, provides substantially linearly calibrated output measurement scales that facilitate size measurement determination, and includes a measure and hold measurement capability which allows an operator of the meter time to take a measurement and subsequently at a later more convenient point in time, read off the measurement value.

A further object of the invention is to provide a portable CN meter having the above desirable characteristics, and which is compact, lightweight, readily transported, easily hand operated, and may be battery energized.

In practicing the invention a portable condensation nuclei meter is provided which includes a manually portable housing and a condensation chamber mounted in the housing with an electro-optic detector circuit viewing the interior of the condensation chamber for deriving an output electric signal representative of the production of clouds of liquid droplets therein. Manually operated pumping means are provided for flushing out the condensation chamber and supplying a sample atmosphere to be monitored at substantially 100 percent relative humidity. Manually operable valving means are included for isolating the condensation chamber during an expansion cycle intermediate each flushing operation. Manually actuated expansion valve means are coupled to the condensation chamber for suddenly expanding the volume of the chamber at a sufficiently rapid rate to supersaturate a trapped specimen of humidified sample atmosphere and form clouds of liquid droplets about the condensation nuclei particles as centers of condensation, the number of droplets produced being proportional to the number of condensation nuclei particles entrained in the sample atmosphere being monitored. Measure and hold measuring circuit means are coupled to the electro-optic detector for measuring the value of the output electric signal pulses produced thereby during the instant of liquid droplet cloud formation to thereby derive an indication of the number of condensation nuclei particles entrained in the sample atmosphere being monitored.

The manually actuated expansion valve means comprises a spring biased, cam operated, reciprocably movable piston enclosed within a cylinder connected to the expansion chamber. The movable piston is manually set against the action of a bias spring to a minimum volume condition or position nd maintained at this position during the flushing operation of the condensation chamber by the pumping means. Manually operable cam means are provided for releasing the movable piston to the action of the biased spring whereby the movable piston is moved to its maximum volume condition or position in a short time period. The movable piston preferably is of a design such that its outer diameter need be formed and/or machined only sufficiently to assure that it will slidably fit within the inner diameter of the cylinder within which it reciprocates. The ends of the movable cylinder are designed to coact with closely fitting sealing means such as O-rings for tightly sealing the movable piston to the cylinder only at each extreme end of the travel thereof whereby the total volume of the condensation chamber and the expansion cylinder is tightly sealed closed only during those intervals while the movable piston is at either extreme end of its travel during the minimum volume and maximum volume conditions.

The sample and hold measuring circuit preferably comprises a constant current, field effect transistor connected in series circuit relationship with the electro-optic detector across a pair of power supply terminals energized from a battery. The field effect transistor amplifier includes long time constant resistor-capacitor network means for maintaining long term, constant current through the series circuit comprising the field effect transistor and the electro-optic detector. A field effect transistor operational amplifier having a feedback circuit is provided along with first switching means for coupling the juncture of the first mentioned field effect transistor and the electro-optic detector to the input of the field effect transistor operational amplifier. A charge storage capacitor is also provided along with second switching means for selectively connecting the output of the field effect transistor operational amplifier to the charge storing capacitor to produce a charge therein proportional to the value of the input signal pulses supplied to the input of the field effect transistor operational amplifier. The first and second switching means are designed in a manner such that they are capable of disconnecting the charge storage capacitor from the output of the field effect transistor operational amplifier and for connecting the charge storage capacitor to the input of the operational amplifier. A linear scale indicating meter is connected to the output of the field effect transistor operational amplifier for providing a substantially linear indication of the peak magnitude of the output signal appearing at the output of the field effect transistor operational amplifier which is representative of the value of the short term pulsed electric signals produced by the electro-optic detector, and hence of the number of condensation nuclei particles being sensed. The field effect transistor operational amplifier is designed to have a high input impedance whereby the charge on the charge storing capacitor can be held and an indication of the value thereof observed by the user of the instrument over comparatively long measuring time periods.

BRIEF DESCRIPTION OF DRAWINGS

Other objects, features and many of the attendant advantages of this invention will be appreciated more readily as the same becomes better understood by reference to the following detailed description, when considered in connection with the accompanying drawings, wherein like parts in each of the several figures are identified by the same reference character and wherein.

DETAILED DESCRIPTION OF PREFERRED EMBODIMENT

Figure 1:
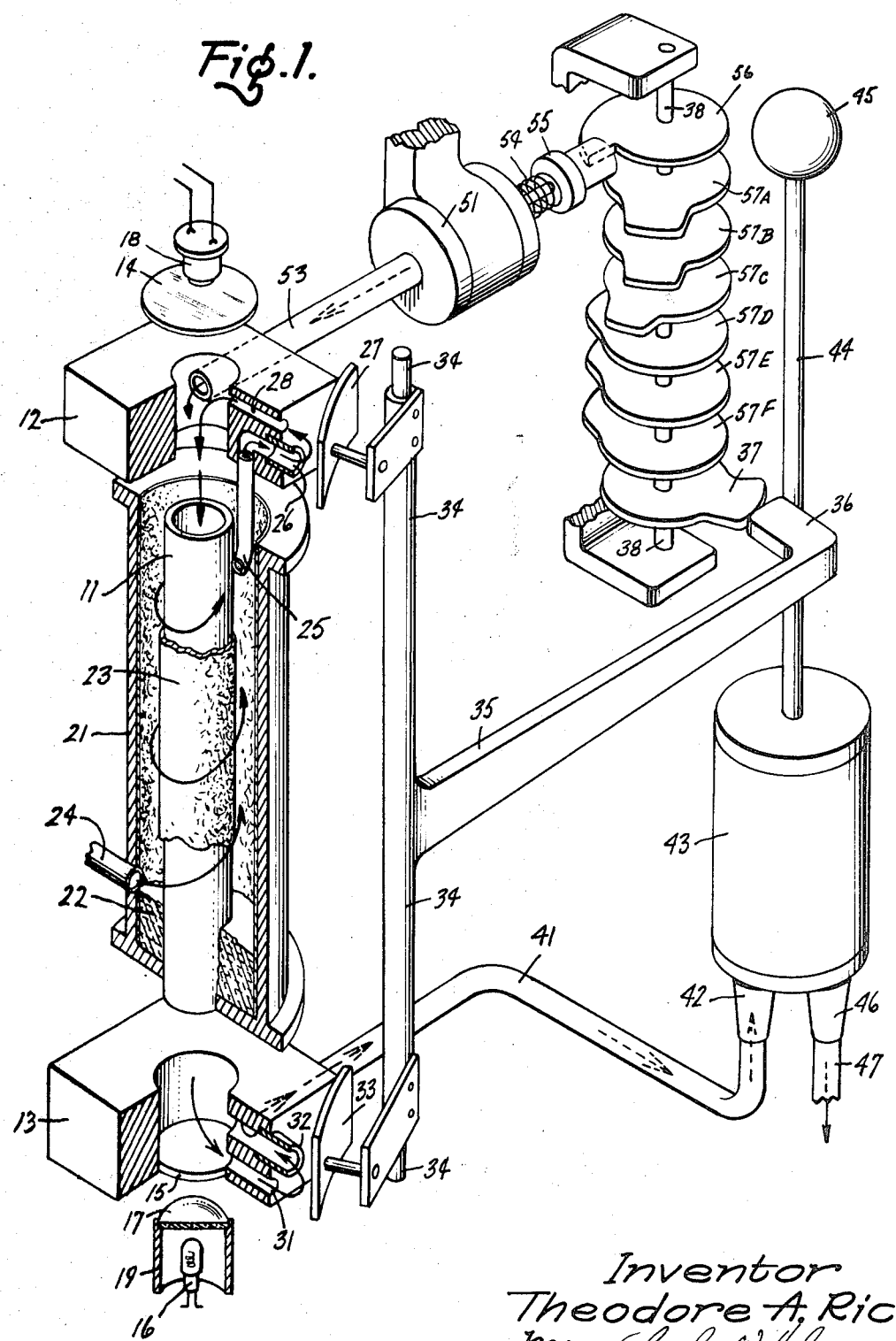
FIG. 1 is a schematic perspective view of the essential mechanical portions of a portable CN meter constructed in accordance with the invention and serves to illustrate the coaction of these several portions.

FIG. 1 is a perspective, schematic view of the overall arrangement of the principle mechanical parts of an improved portable CN meter constructed in accordance with the invention and illustrates clearly the manner in which the various portions of the meter are assembled in coacting relationship with respect to each other and also with respect to an electro-optic sensing and signal developing arrangement. The instrument is built around an elongated, cylindrically shaped condensation chamber 11 which may be fabricated from glass, plastic, metal such as aluminum, etc. The ends of the condensation chamber 11 are closed by suitable valve block members 12 and 13 which include light transmitting closure members or windows indicated generally at 14 and 15 for allowing an interrogating light beam to view and to be transmitted through the condensation chamber from a light source 16 and focusing lens arrangement 17 and to impinge upon an electro-optic photo-detecting device 18 such as a photo cell, a photo diode, a photo transistor, etc, but which in the embodiment shown comprises a photo sensitive resistor. The light source 16 preferably is a solid state light source such as a gallium arsenide light emitting diode having an indefinite operating light (approximately 87 years). The light source 16 preferably is supported along with the lens 17 in a cylindrical holder to which they are secured by suitable fixtures or fittings and then sealed in place with an epoxy resin. Preferably the light source 16 is supported within the tubular holder shown at 19 and a small amount of glass wool or other filter material used to close the end of the holder but which allows breathing or heat transfer for assuring prolonged operating life for light source 16.

The condensation chamber is disposed within an outer liquid tight chamber 21 preferably formed of aluminum and which concentrically surrounds the expansion chamber 11. The outer liquid tight chamber 21 is designed to be supported in the upright position shown in FIG. 1 and has disposed therein a suitable humidifying liquid 22 such as water. The water contacts a suitable wicking material such as felt 23 that immediately surrounds and is supported by the condensation chamber 11 and also preferably is disposed around the inside periphery of chamber 21. The The wicking material 23 extends over almost the entire length of the condensation chamber 11 and is in contact with the liquid 22 so that it is continuously wetted and assures proper humidification of the sample gases flowing past the wicking material. By reason of this construction, drying out of the humidifier can be easily avoided through proper filling of the chamber 21 prior to undertaking a series of measurements and only infrequent checking of the humidifier is required during operation.

Access to the exterior of the instrument is provided through the otherwise liquid tight interior 21 by means of a sample inlet port 24 through which gaseous samples of an atmosphere to be monitored are drawn. The gaseous samples thus drawn into the chamber 21 flow in the direction of the arrows up past and around the wicking material 23 so as to be suitably humidified and thence out through an outlet tube 25. The outlet tube 25 communicates through conduits formed in the valve block 12 with an inlet port shown at 26 under the control of an inlet valving member 27, and thence through a conduit 28 into one end of the condensation chamber 11. In the condensation chamber, gaseous samples thus humidified and drawn in, periodically are expanded to form a cloud of water droplets as previously explained, the water cloud droplet measured by the electro-optic measuring means 16, 18, and the sample then re-evaporated and flushed out of the chamber. In flushing out expansion chamber 11 the sample gas passes out through a conduit 31 formed in the valve block member 13 and thence through an outlet port 32 under the control of an outlet valving member 33. The valving members 33 and 27 operate jointly from a common, rotatable drive shaft 34 that in turn is driven by a lever arm 35 actuated by a cam follower 36 that responds to a manually rotatable, camming member 37. The camming member 37 is mounted on a common cam shaft 38 along with a plurality of other camming members whose function will be described more fully hereinafter.

The gaseous samples flowing out of outlet port 32 after being through the expansion chamber 11 and humidifier 21 in the previously described manner, are exhausted through an exhaust conduit 41 that is connected to an inlet port 42 of a manually operable, reciprocal air pump 43. The air pump 43 includes a reciprocating shaft member 44 having one end connected to a reciprocating piston and the other end connected to a knob 45 or other pump handle whereby an operator of the instrument can grasp the knob 45 and pump the air pump up and down to the extent required. During the up stroke of the piston connected to rod 44 the gaseous sample is drawn through exhaust conduit 41 and through a one-way check valve arrangement contained within inlet port 42 into air storage space within the housing of the pump 43. During the down stroke of the air pump, the one way check valve in inlet 42 closes and second one way check valve in an outlet port 46 opens to allow the gas to be exhausted out to the atmosphere through an exhaust conduit 47. For certain low concentration measurements, it may be desirable to include a filter (not shown) in the exhaust conduit 47 to avoid possible contamination where there are high background concentration present in the locale of the instrument.

In operating the instrument, a user first sets the camming member 37 in the position shown so that the inlet and outlet valves 27 and 33 are in the open position. Thereafter, the user pumps the air pump up and down as previously described to thereby pump a sample of the atmosphere to be monitored through and into the condensation chamber 11. The camming member 37 then is turned so as to allow cam follower 36 and lever arm 35 to rotate the inlet and outlet valves 27 and 33 to their closed positions over their inlet and outlet access ports 26 and 32 to the condensation chamber 11 thereby trapping a specimen of the sample atmosphere in the condensation chamber.

At this point in an operating cycle of the CN meter, the sample gaseous atmosphere is ready for expansion by an expansion valving means or apparatus shown generally at 51. The expansion valve apparatus will be described more fully hereinafter but briefly comprises an enclosed space or cylinder having a reciprocal valve member that travels between a minimum volume and a maximum value position. The inside of the cylinder communicates through a conduit 53 with the interior of expansion chamber 11 so that as the movable piston travels from its minimum volume position to its maximum volume position, the space within condensation chamber 11 suddenly is expanded sufficiently rapidly to supersaturate a trapped specimen of a humidified sample atmosphere and to form a cloud of water droplets about condensation nuclei particles as centers of condensation. The number of water droplets produced will be proportional to the number of condensation nuclei particles entrained in the sample atmosphere trapped in the condensation chamber. The cloud of droplets thus formed will adsorb, scatter or otherwise modify the light beam from light source 16 in a manner to produce a pulsed electric output signal in the photo detector 18 which subsequently can be measured to provide an indication of the number of the condensation nuclei particles.

In order to cause the movable piston in the expansion valve 51 to travel from its minimum volume to its maximum volume position to sufficiently rapidly, the movable piston is first set or cocked against the action of a return spring shown at 54 by means of a connecting rod and cam follower 55 that coacts with a manually rotatable cam member 56 mounted on the common cam shaft 38 and rotatable therewith. It will be seen that with this arrangement, rotation of the cam member 56 to a first or flush position, sets the movable piston member in expansion valve means 51 against the action of return spring 54. Thereafter, following closure of the inlet and outlet valves 27 and 33, further rotation of the camming member 56 releases the movable piston to allow it to be driven to its maximum volume condition rapidly by the coil return spring 54 thereby quickly expanding the volume of the condensation chamber 11.

FIG. 2 is a longitudinal sectional view of a portable CN meter constructed in accordance with the invention and showing the assembly of FIG. 1 mounted within a suitable housing 10 having a separable cover 9 seated thereon by means of sealing gaskets. As shown in FIG. 2 at appropriate points where conduits interconnect the various parts of the assembly or extend through housing 10 to the exterior, at points such as shown at 24, suitable sealing gaskets are provided for preventing leakage in the passage ways interconnecting the several parts of the assembly. Because corresponding parts of FIG. 2 have been given the same reference numeral as identified in FIG. 1 it is not believed necessary again to trace through the construction and operation of the condensation nuclei meter as shown in FIG. 2.

At the right hand side of FIG. 2 the construction of the pump assembly 43 is illustrated in greater detail. It will be seen that the connecting rod 44 having its upper end secured to knob 45, is connected at its lower end to a reciprocal piston member 61. As the piston member 61 is moved upwardly air will be exhausted out through a port 62 and gas samples from condensation chamber 11 will be drawn through the inlet port 42 into the space opening up underneath the piston 61. A one way check valve for regulating air flow only into the cylindrical pump housing 43 during the upward stroke of movable piston 61 is shown generally at 63. Thus, it will be appreciated that as piston 61 moves upwardly it will draw a sample of the air or other atmosphere to which inlet 24 is exposed through the humidifier 21, conduit 25, inlet 26, access passageway 28, thence through the condensation chamber 11, out through passageway 31 and outlet port 32, and conduit 41 to the inlet 42 of the pump. On the down or discharge stroke of piston 61 a second one way check valve 64 will open to allow the gas thus drawn into the pump to be discharged out to the outlet 46 and conduit 47. During the discharge stroke, because of its one way check valve character, valve 63 will close off the inlet port 42 to prevent discharge of the sample gas back into condensation chamber 11. Similarly, during the up or intake stroke the one way check valve 64 will prevent air from being drawn in through the outlet opening 46. To avoid possible contamination due to leakage past the one way valves prior to closure, it may be desirable to locate a filter in the discharge conduit 47. The reciprocating connecting rod 44 is slidably seated in a seal 65 formed on a cap 66 secured to the cylindrical pump housing 43, and in a sliding seal 67 formed in the cap 9 of the outer housing. The various components of the assembly are secured to the outer housing 10 at the appropriate points by the mounting brackets and machine bolts such as shown at 68. If desired, the air pump may be comprised by a standard commercially available air pump similar to a bicycle tire pump modified for sucking rather than blowing.

FIG. 3 of the drawings is a longitudinal sectional view of a completely assembled portable CN meter taken through plane B—B of FIG. 2 and illustrates in greater detail the construction and mounting of the common cam shaft 38 and cam members 37, 56 and 57A–57F. The rotatable cam shaft 38 is supported in suitable bearing members 71 and 72 formed at the ends of an integral mounting bracket 73 secured within housing 10 by means of machine bolts not shown. The mounting bracket 73 also supports the expansion valve assembly 51 in a manner such that the connecting rod 55A having one end connected to the movable piston, (not shown in FIG. 3), extends to and is connected with the cam follower 55 that rides on camming member 56. The rotatable cam shaft 38 is keyed to a manually rotatable control knob shown at 74 for rotating cam shaft 38 and hence all of the cam members keyed to 38.

In addition to the above features, FIG. 3 illustrates on each side of the housing 10, which may be fabricated from aluminum, plastic, or some other suitable material, sets of coacting clasps 75 and hooks 76 formed on top 9 for securing top 9 to the main body of housing 10. Additionally, mounting brackets are shown at 77 for mounting batteries 78 within the interior of housing 10 and connecting leads 79 are provided for connecting the battery to the electronic measuring circuitry shown in FIG. 6. Alternatively, in place of the batteries 78 a suitable standard commercially available power supply for converting alternating current to direct current may be inserted in the place provided for batteries 78 for those applications of the instrument where complete portability is not required and commercial or residential alternating current electric power is available.

FIG. 4 is a cross sectional view of the complete portable CN meter taken through plane C—C of FIG. 3. FIG. 4 is instructive in that it discloses in greater detail the construction of the expansion valve assembly 51 as well as to illustrate further the interconnections between the various parts of the meter. As shown in the upper right hand portion of FIG. 4 the expansion valve assembly 51 includes a reciprocally movable cylindrical piston 81 that is slidably supported within a cylindrical bore formed in the outer casing that defines the expansion valve assembly 51. The movable piston 81 as well as the cylindrical bore in member 51 need not be precision made, expensive parts but may be formed by casting and sufficient machining to assure at least a loose fit thereby allowing these parts to be fabricated rather economically. In addition, this characteristic feature allows the movable piston 81 to be cocked by cam 56 against the return spring action of the return spring 54 without too great an effort on the part of an operator of the meter since it allows a comparatively weaker return spring to be used then otherwise might be required in order to drive movable piston from its extreme, left-most (as viewed in FIG. 4) end position corresponding to the minimum volume condition or position to its right-most or maximum volume condition within a sufficiently short period of time to assure supersaturation of the trapped sample in condensation chamber 11. It will be seen in FIG. 4 that the space within the bore formed within member 51 communicates through the conduit 53 directly with the interior of the condensation chamber 11.

With the movable piston 81 in its left-most or minimum volume position it will be seen that none of the volume of the bore in member 51 will be included in the overall enclosed volume comprising condensation chamber 11 and the conduit 53. Further, it should be expressly noted that the end of piston 81 engages and seals against an O-ring sealing gasket 82 which tightly seals the space around the periphery of piston member 81 against leakage. Thus, while in the minimum volume condition no leakage takes place into the condensation chamber. The same situation exists with respect to the opposite extreme end of the travel of piston member 81 wherein it can be seen that the right hand end (as viewed in FIG. 4) of the piston member engages a sealing O-ring 83 upon the piston member being driven to the extreme right hand side of its travel corresponding to the maximum volume position or condition. It is only during the relatively short time period while the piston member 81 is being moved between the extreme opposite ends of its travel that any leakage can take place even if the piston member is only roughly machined and loosely fits the bore in member 51. This leakage is minimal and does not impair operation of the instrument. However, this particular design feature, does make it possible to use a weaker return spring 54 than otherwise might be required so as to minimize the force necessary to rotate cam 56 clockwise from the position shown and cock or set movable piston 81 to its minimum volume position against the action of return spring 54.

Figure 4:
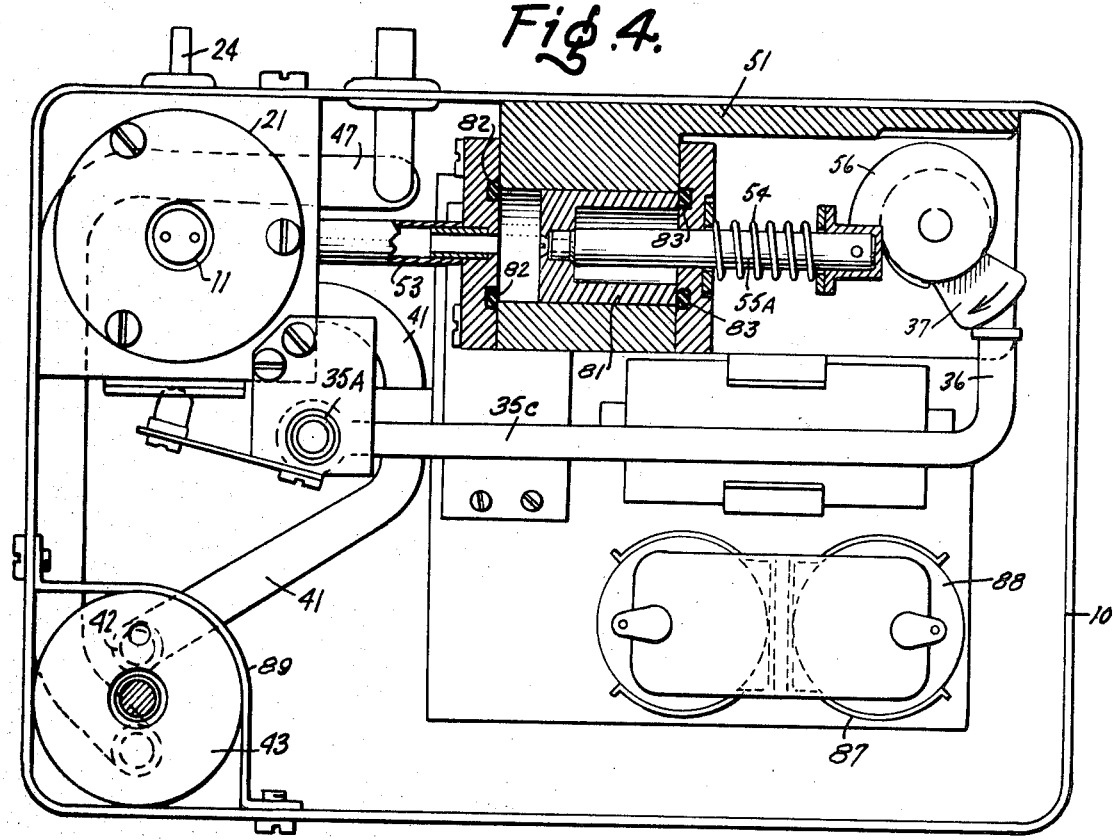
FIG. 4 is a top plan view of the portable CN meter and illustrates in greater detail the construction of the novel expansion valve apparatus comprising a part of the invention.

In addition to the above features, FIG. 4 illustrates some additional batteries 88 and mounting brackets 78 for use in energizing the electric circuitry of the meter. FIG. 4 also illustrates the manner in which the pump assembly 43 is mounted within housing 10 with a u-shaped bracket 89. As stated previously, the pump assembly 43 may comprise a commercially available, reverse air pump having the required two way check valve action described previously in connection with FIG. 4.

Figure 5:
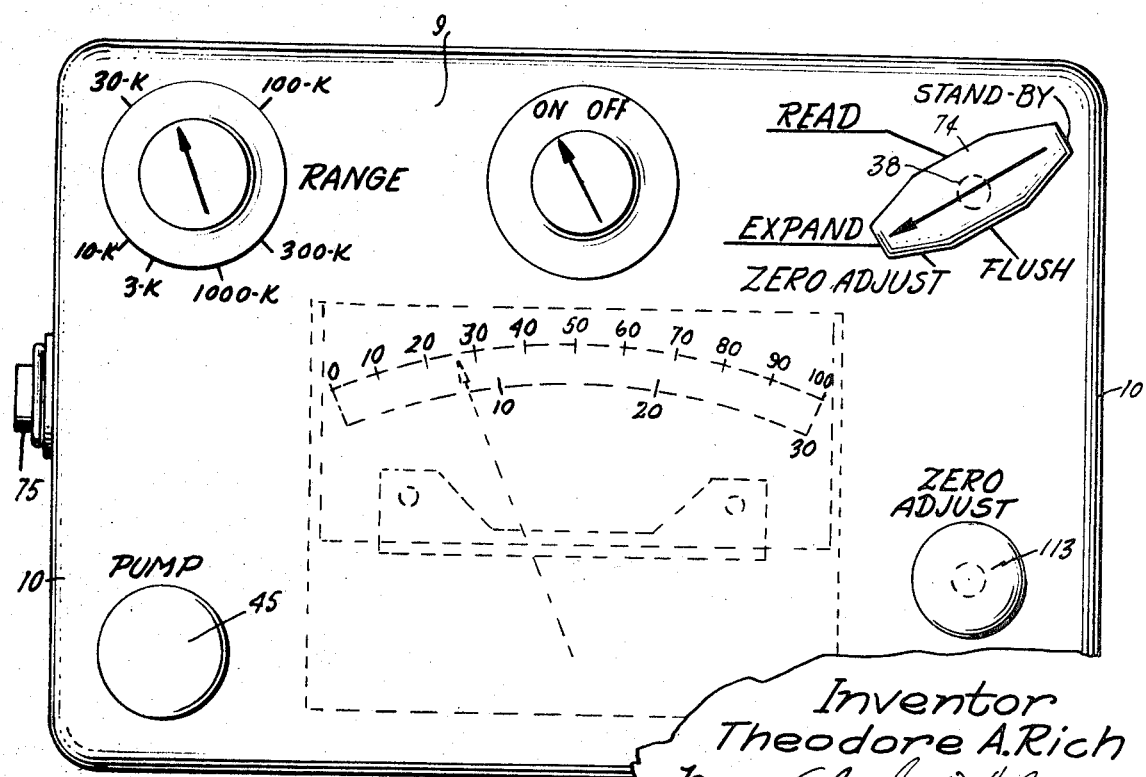
FIG. 5 is a top plan view of the outer housing of the portable CN meter showing the various operating switches and control knobs as well as the output indicating meter scale.

FIG. 5 is a planar top view of the cover 9 for the portable CN meter and illustrates the manner in which the several control knobs and linear scale indicators of meter are laid out to simplify use of the instrument. At this point in the description, it is only necessary to note that the control knob or handle 74 which rotates the common cam shaft 38 is provided with five different positions identified as FLUSH, ZERO ADJUST, EXPAND, READ and STAND-BY. As best illustrated in FIG. 1, the cam members 35, 56, and 57A–57F are arrayed on the common cam shaft 38 in such a manner that in the FLUSH position, the movable piston member 81 will be set or cocked against the action of the return spring 54, and the inlet and outlet ports 26 and 32 will be open to allow the air pump to flush a sample of the atmosphere to be monitored through the condensation chamber 11 in the manner previously described. Thereafter, with the control knob 74 rotated to a position to allow the cam follower 55 to be returned by the action of return spring 54 to place movable piston 81 in its maximum volume position as shown in FIG. 4.

Figure 6:
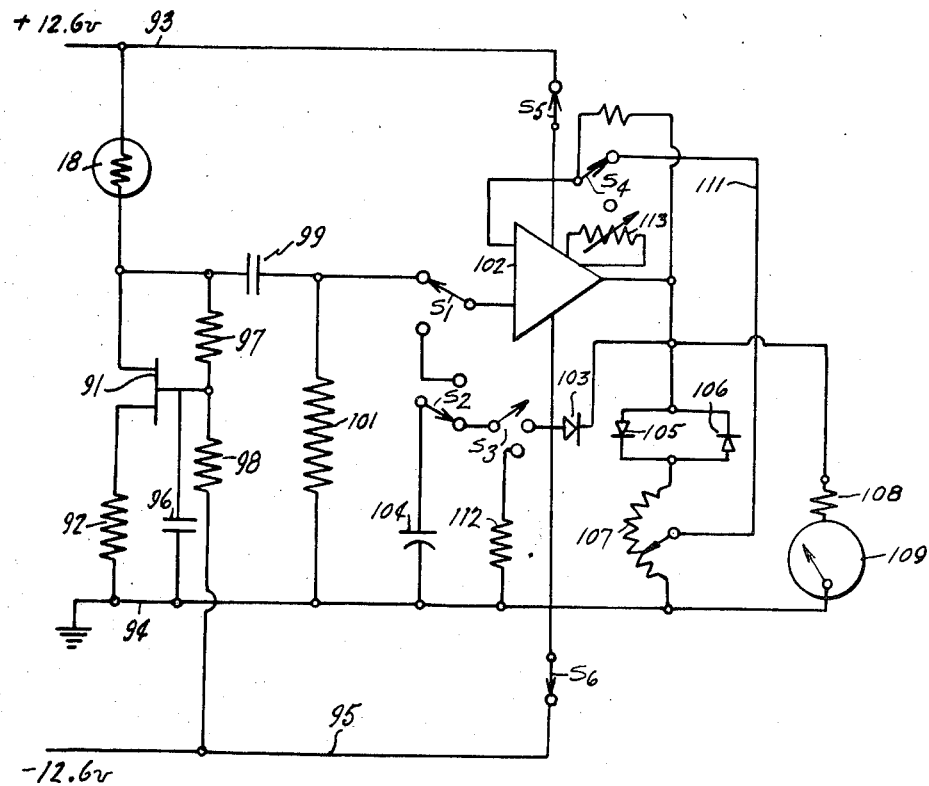
FIG. 6 is a schematic circuit diagram of the measure and hold measuring circuit employed in the portable CN meter.
Figure 7:
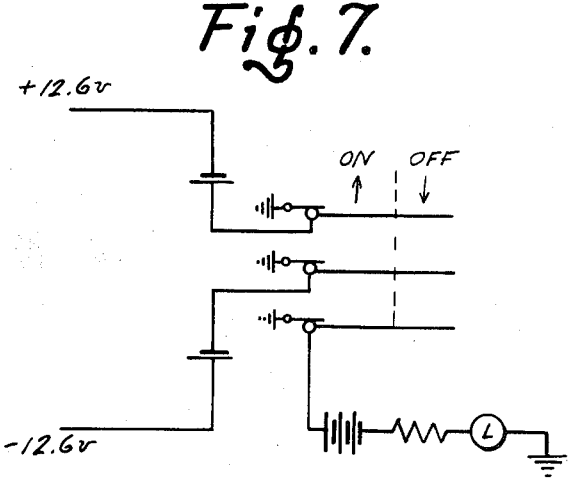
FIG. 7 is a circuit diagram of a battery power supply for the CN meter.

FIG. 5 is a schematic circuit of the electronic circuitry used to measure the peak value of the electric signal pulses produced in the photo detector device 18. As shown in FIG. 6 the photo detector 18 is connected in series circuit relationship with the source and drain electrodes of a field effect transistor 91 and a load resistor 92 with the series circuit thus comprised being connected across a pair of power supply terminals 93 and 94. As shown in FIG. 7, the power supply terminal 93 is maintained at a voltage of +12.6 volts by a suitable source of electric energy such as dry cell batteries, the terminal 94 is maintained at circuit ground potential, and a third power terminal 95 is provided at a potential of −12.6 volts. Electric energy is supplied from the batteries to terminals 93 and 95, and current is supplied to light source 16 from a 3 volt dry cell battery and dropping resistor through a suitable on-off switch 90. If desired a standard, commercially available, rectifier power supply such as those employed to power integrated circuit operational amplifiers from a conventional residential or commercial 115, 60 cycle 15–30 amp, single phase power supply, could be employed in place of the battery power supply shown in FIG. 7.

The field effect transistor 91, (hereinafter referred to as a FET) has its gate electrode connected to a long time constant, resistance-capacitance network comprised by a capacitor 96 and a pair of series connected resistors 97 and 98 connected in series circuit relationship with the photo resistor 18 between the +12.6 volt power supply terminal 93 and the −12.6 volt power supply terminal 95. The juncture of the two resistors 97 and 98 and one electrode of the capacitor 96 is connected to the gate electrode of FET 91 with the remaining electrode of capacitor 96 being connected to the ground terminal 94. The time constant of the RC biasing network thus comprised is such as to maintain essentially long term, constant current through the series connected FET 91 and photo detector 18 despite aging, dust or moisture accumulation on the optics, etc.

Figure 2:
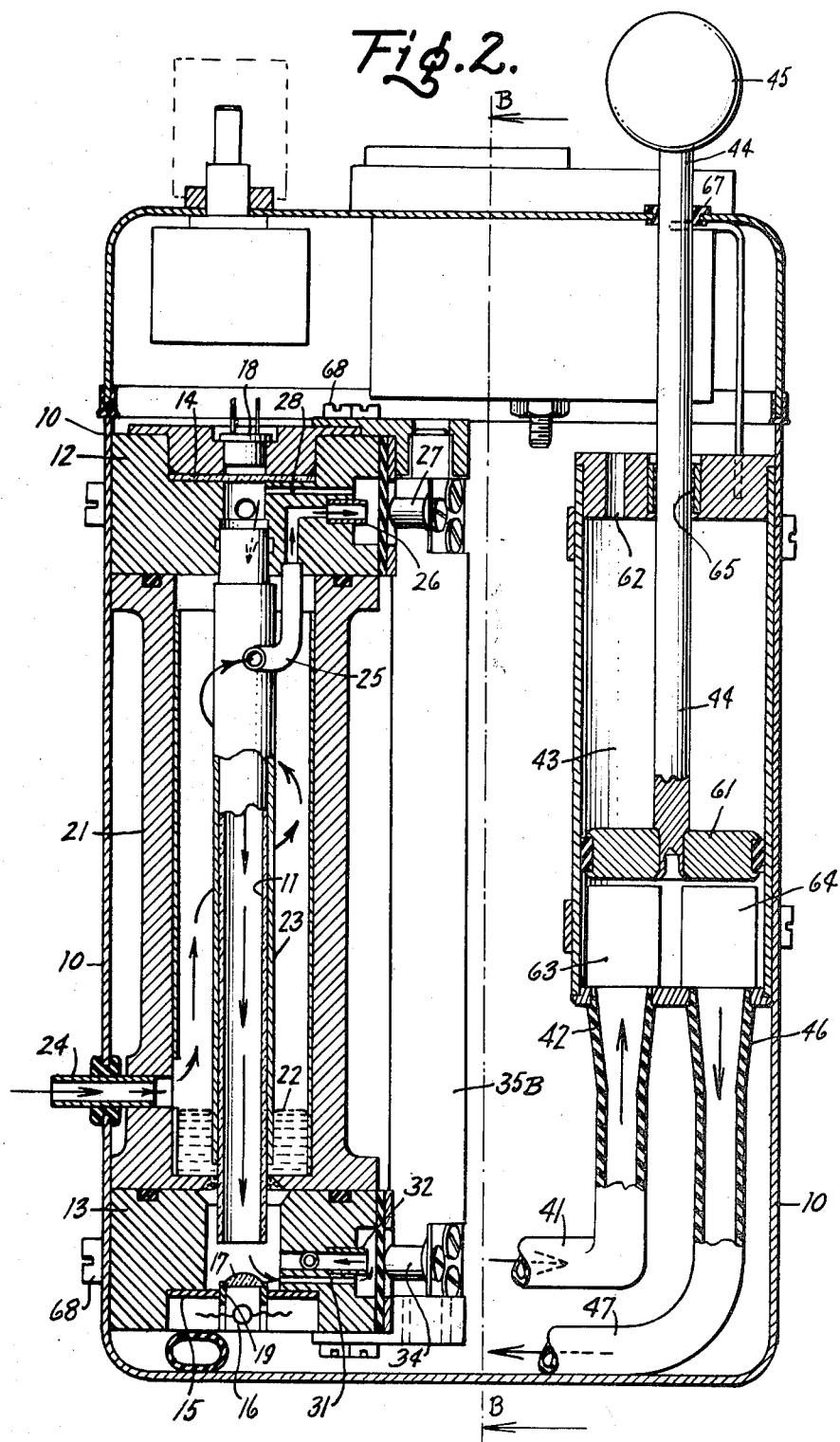
FIG. 2 is a side sectional view (taken through plane A—A of FIG. 4) of a complete portable CN meter constructed in accordance with the invention including the several parts shown in FIG. 1 mounted within a suitable portable housing.
Figure 3:
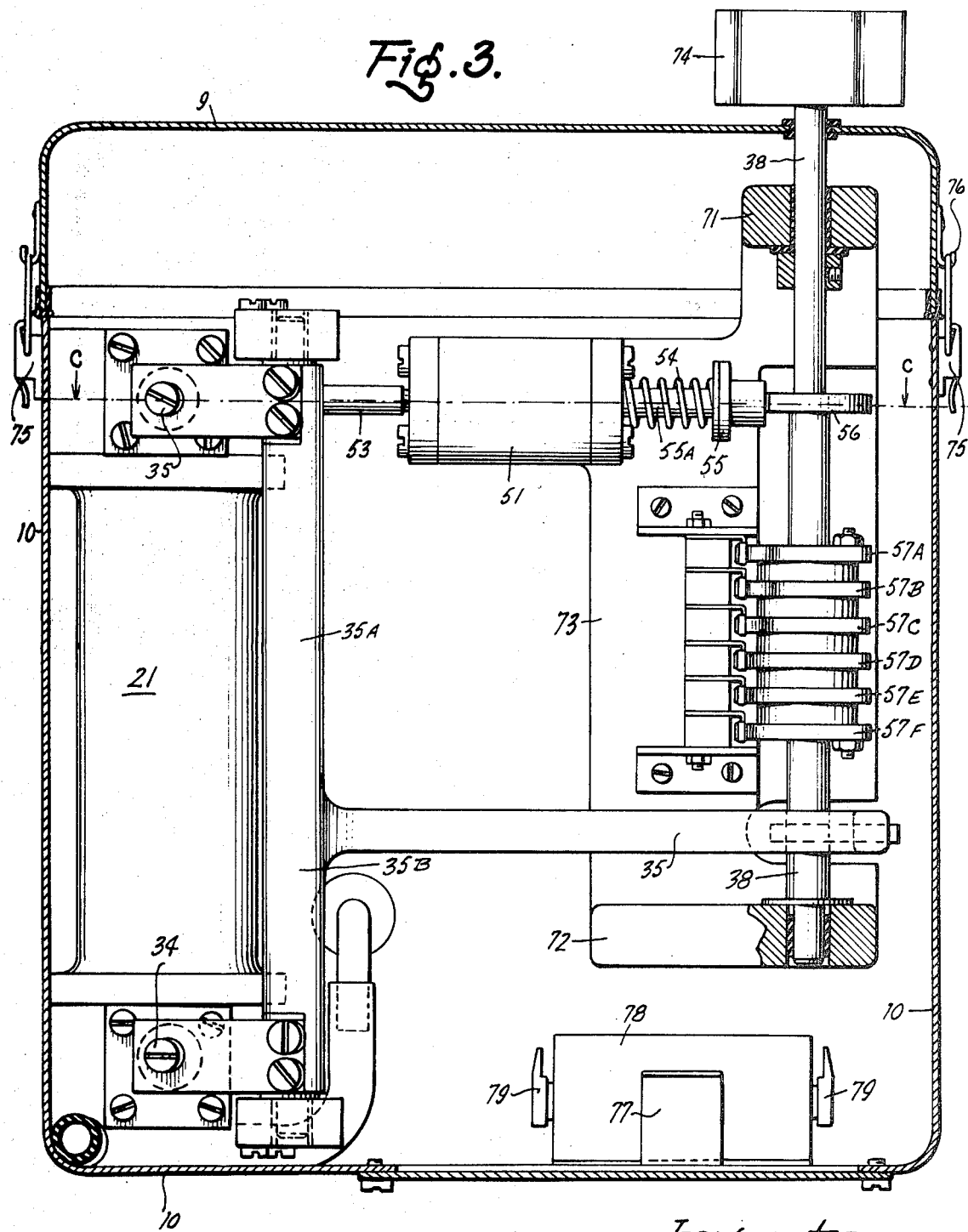
FIG. 3 is a sectional view of the portable CN meter taken through plane B—B of FIGS. 2 and 4.

The photo detector 18 is of the type which exhibits minimum impedance upon being illuminated by the light source 16 shown in FIGS. 1 and 2. Hence, the long time constant adjusting capability of the FET amplifier formed by FET 91 and the RC biasing network adjusts the current through the series circuit so as to compensate for long term aging effects, dirt or dust accumulation on the lens, etc. However, because of the long time constant this circuit does not compensate for short term effects such as would be produced by a cloud of water droplets in the condensation chamber 11. The appearance of such a cloud of water droplets produces a scattering and/or an absorption effect on the light normally impinging upon the photo detector 18 so that the photo detector suddenly increases in impedance. Because the FET 91 is essentially a constant current device, this results in the production of a negative going voltage pulse at the juncture of photo detector 18 with the FET 91. This negative going signal pulse is coupled through a short time constant RC coupling network comprised by a capacitor 99 and resistor 101 through a switch S1 to the input terminal of an FET operational amplifier 102. The FET operational amplifier 102 may comprise any standard, commercially available, monolithic integrated circuit FET operational amplifier chip such as those manufactured and sold by a number of semiconductor manufacturers.

The FET operational amplifier 102 has its output connected through a series circuit comprised by a coupling diode 103, a second selector switch $S_2$ a third selector switch $S_3$ to a charge storing capacitor 104. In addition the FET operational amplifier 102 has its output coupled through a diode compensating circuit comprised by a pair of parallel connected, reversely poled diodes 105 and 106 to one terminal of a range changing variable resistor 107, and coupled through a limting resistor 108 to one terminal of an indicating meter 109 of the D'Arsonval type with the remaining opposite terminal of the indicating meter 109 and the remaining fixed terminal of the range changing resistor 107 being connected to ground. The movable contact of the range changing resistor 107 is connected back through a conductor 111 to one contact of a range changing fourth connector switch $S_4$ connected in a removable outer feedback loop formed for the FET operational amplifier 102. Fourth selector switch $S_4$ includes an additional, open circuit contact which decouples the range changing resistor 107 from the output of the FET operational amplifier 102. Upon $S_4$ being closed on this additional, open contact the gain characteristics of the operational amplifier are adjusted by a fixed resistor 110 connected in a fixed outer feedback loop in FET operational amplifier 102 to provide a one to one gain. With the selector switch $S_4$ closed to include the range changing resistor 107, the gain of the amplifier 102, and hence its output, will be determined by the setting of the movable contact of the range changing resistor 107 and the value of the input signal supplied to the FET operational amplifier 102.

In the embodiment of the peak measure and hold circuit shown in FIG. 6, additional switch contacts $S_5$ and $S_6$ are included for selectively energizing and de-energizing the FET operational amplifier 102 during measurement periods and periods of non-use, respectively. As a consequence, with the additional switches $S_5$ and $S_6$ open, the operational amplifier 102 will not load the batteries thereby prolonging their operating life. The photo detector 18 and FET amplifier 91 are maintained in the circuit during all portions of the operating cycle because these elements take a fraction of a minute or more to stabilize if they are switched in and out of the circuit. In the event that an op amp power pack is used in place of the battery power supply of FIG. 7, then switches $S_5$ and $S_6$ would be eliminated and a simple on-off switch (not cam operated) would be inserted in their place. In either embodiment, of the peak measure and hold circuit, photo-detector 18 and FET 91 will be maintained energized at all times during an operating cycle while the master on-off switch corresponding to switch 90 in FIG. 7, is closed.

Referring now primarily to FIGS. 1, 5 and 6, the operation of the portable CN meter is as follows: With the control knob 74 in the STANDBY position, and with the master ON-OFF switch 90 of FIG. 7 turned-on, power will be supplied to terminals 93–95, solid state light source 16, photo-detector 18 and FET 91 to allow these elements to stabilize. Switches $S_5$ and $S_6$ will be open so that FET op amp 102 is de-energized and does not load the batteries, and selector switches $S_2$ and $S_3$ are closed on their lower contacts so as to discharge capacitor 104 through a resistor 112. During periods while the meter is being used but not actually making a measurement, it is left in the STANDBY condition.

Thereafter, when a measurement is to be made, control knob 74 is turned to the FLUSH position where inlet and outlet ports 26 and 32 will be open and the FET operational amplifier 102 will be energized due to the closure of the additional switches $S_5$ and $S_6$ by one of the cam members 57A through 57F, respectively. The pump 45 is then pumped up and down by the operator at a moderate rate so as to flush a sample of the atmosphere being monitored into the condensation chamber 11. Turning of the control knob 74 to the FLUSH position also sets piston 81 in FIG. 4 to its minimum volume position sealed on O-ring 82 by the cam member 56 which in the FLUSH position serves to cock the movable piston member against the action of the return spring 54. The electro-optic system light source 16 will be maintained on and the detector 18 and FET 91 energized.

With the portable CN meter conditioned in the above manner, the knob 74 may be then switched to its ZERO ADJUST position, but normally would be quickly switched through to the EXPAND position since the instrument holds its zero setting very well and need be checked only infrequently. While in the ZERO ADJUST position, or while passing through this position, cam member 37 closes the inlet and outlet ports 26 and 32 with the valve members 27 and 33. Also at this point in the measurement cycle, the cam member 37C associated with selector switch $S_3$ closes this switch onto its upper contact connected to diode 103. Previously, selector switch $S_3$ will have been closed on its lower contact so as to discharge capacitor 104 through a short time constant discharge circuit comprised by resistor 112. Also, at this point in the measurement cycle switch $S_2$ will be closed on its lower contact so as to connect charge storing capacitor 104 through switch $S_3$ and diode 103 to the output of FET operational amplifier 102. Switch $S_1$ will be closed on its upper contact so as to couple the juncture of the photo detector 18 and FET 91 to the input of the FET operational amplifier 102. Thereafter, while initially adjusting the zero setting, a ZERO ADJUST resistor 113 connected in an inner feedback loop of the FET operational amplifier 102, is adjusted to bring the indicator needle on indicating meter 109 to its ZERO position.

At this point in the measurement cycle the operator then twists the control knob 74 to the EXPAND position shown in FIG. 5. It should be noted that for most measurements, the operator will go directly from FLUSH through to EXPAND without pausing at the ZERO ADJUST position since the zero setting correction need be made only infrequently. At the EXPAND position, expansion valve piston 81 is released and moves to its maximum volume condition or position where it seals against the O-ring 83 as shown in FIG. 4. This results in producing a cloud of water droplets in the condensation chamber and a peak signal pulse at the input of FET operational amplifier 102. For a concentration of approximately 100,000 nuclei particles per cubic centimeter, the signal produced at the juncture of photodetector 18 with FET 91 is in the neighborhood of −1 volt. This signal is amplified to about four volts by the FET operational amplifier 102 and is supplied to charge storing capacitor 104 through diode 103 and selector switches $S_3$ and $S_2$. Diode 103 prevents the indicating meter and range changing resistor 107 from loading the capacitor during this interval and allows the capacitor to be charged to the peak value of the amplified input signal. The drop across the blocking diode 103 is compensated for by the compensating diodes 105 and 106 thereby obviating and erroneous reading of the particles being measured. For a particle count of about 10,000 particles per cubic centimeter the input to amplifier 102 is about one-tenth of a volt and this will be amplified to four volts by appropriate adjustment to the gain of FET operational amplifier 102 by the feedback potentiometer 107 connected in the feedback circuit of operational amplifier 102 by selector switch $S_4$ being switched to its upper contact.

At the convenience of the operator of the instrument the control knob 74 is then switched to the READ position. This operates to first connect the capacitor 104 through second switch $S_2$ to an open circuit point, and then subsequently close switch $S_1$ on its lower contact and switch $S_4$ on its lower, open circuit contact. This sequence of switching events is required in order to avoid switching surges or transients which otherwise might change the charge on the charge storing capacitor 104. Switching of $S_4$ to its lower, open circuit contact converts operational amplifier 102 to a one to one amplifier so that its output is equal to the charge on the capacitor 104 which in turn is proportional to the number of particles measured per cubic centimeter. The value of the charge will appear in the reading on the indicating meter 109. Indicating meter 109 is of the D'Arsonval type so that its indicating needle will be deflected linearly a distance which is proportional to the voltage applied across the meter. Hence, the scale of the meter can be linearly calibrated in the manner shown in FIG. 5 to simplify reading of the meter by even unskilled persons. This characteristic, and the multiple scales provided on the face of the meter as shown in FIG. 5, facilitates use of the condensation nuclei meter in making size determinations through the use of appropriate ancillary measurement apparatus in a manner known in the art. In addition, because of the high input impedance of the FET operational amplifier 102, capacitor 104 will stay charged for a relatively long time period allowing a discharge rate on the order of 1 percent a minute only. Accordingly, an operator of an instrument can read the instrument at any desired time over comparatively long measurement intervals at his convenience without fear of adversely affecting the reading.

Following the measurement obtained in the above described manner, the control knob 74 is then returned to the STANDBY position where the selector switches $S_5$ and $S_6$ will again be opened to save the battery. At this point the switch $S_3$ will be closed on its lower contact to discharge 104 through resistor 112 so as not to carry over any charge in the capacitor into the next measurement cycle. The voltage across the photodetector 18 and FET 91 is maintained because it takes sometime for these elements to stabilize if they are switched on and off.

With a portable CN meter constructed in the above described manner, condensation nuclei particles practically can be measured within a size range of 0.001 to 100 microns in diameter. The concentration of such particles may range from 200 to $10^7$ nuclei per cubic centimeter with range selections being provided from 0 to 3,000, 0 to 10,000, 0 to 30,000, 0 to 100,000 and 0 to 300,000 with substantially linear reading. The instrument has a repeatability of plus or minus 2 percent of a point. Power to the instrument is provided by dry cell batteries having voltage rating of 12.6 volts or alternately in the event that an op amp power pack is employed, the input may be from a 115 volt, 60 watt standard commercial or residential power source. The instrument is packaged in a housing on the order of 12 inches by 8 inches by 6 inches and weighs less then 10 pounds.

From the foregoing description, it can be appreciated that the present invention provides a new and improved portable condensation nuclei meter which is easily transported and operated by a single, unskilled operator, using one hand only. The meter provides a linear scale uniform output measurement repeatedly so as to facilitate size measurements. Further, the portable CN meter includes a measure and hold measurement capability which allows an operator of the meter time to take a measurement and subsequently at a later more convenient time read off the values measured. A water supply is provided in the humidifier so that drying-out, common to known portable CN meters, is less likely. A solid state light source having indefinite operating life (87 years) is used. Because of measures taken to conserve energy during periods of non-use, battery operating life is on the order of 700 hours. Full scale as well calibrated values are provided and are adjustable. Stable and readily adjusted zero setting adjustment is provided, with the calibration being maintained even through normal and long term changes in the electro-optics path. The air pump flushes air samples through the unit but does not have to produce a predetermined pressure or vacuum. In addition, the protable CN meter is compact, light weight, readily transported and operated and may be battery energized or power pack operated from a conventional residential or commercial alternating current power source.

Having described one embodiment of a new and improved condensation nuclei meter constructed in accordance with the invention it is believed obvious that other modification and variations fo the invention are possible in the light of the above teachings. It is therfor to be understood that changes may be made in the particular embodiment of the invention described which are within the full intended scope of the invention as defined by the appended claims.

What is claimed is:

1. In a portable condensation nuclei meter including a manually portable housing, a condensation chamber disposed in said housing, electro-optic means viewing the interior of the condensation chamber for deriving an output electric signal representative of the production of a cloud of liquid droplets therein, manually operated pump means for flushing out the condensation chamber and supplying a sample atmosphere to be monitored thereto at substantially 100 per cent relative humidity, manually operable valving means for isolating said condensation chamber during an expansion, means coupled to said condensation chamber for suddenly expanding the volume thereof at a sufficiently rapid rate to supersaturate a trapped specimen of humidified sample atmosphere and form a cloud of droplets about condensation nuclei particles entrained therein as centers of condensation, the number of droplets produced being proportional to the number of condensation nuclei particles entrained in the sample atmosphere being monitored, and measuring circuit means coupled to said electro-optic means for measuring the value of the output electric signal produced thereby during the instant of liquid droplet cloud formation to thereby derive a measure of the number of condensation nuclei particles entrained in the sample atmosphere being monitored, the improvement wherein said manually actuated expansion means comprises an expansion cylinder connected to the expansion chamber, spring biased cam operated reciprocally movable piston means enclosed within said expansion cylinder, return spring means, hand operated cam means for manually setting the movable piston means against the action of the return spring means to a minimum volume position, means for manually setting the movable piston means at the minimum volume position during flushing operation of the condensation chamber by the manually operated pumping means, said hand operated cam means being actuable for releasing the movable piston means to the action of the biased return spring means whereby the movable piston means is moved to its maximum volume position in a short time period by the return spring means, said movable piston means having its outer diameter easily slidable within the inner diameter of the expansion cylinder, and close fitting sealing means coacting with the ends of the expansion cylinder and the movable piston means for tightly sealing the movable piston means to the expansion cylinder only at each extreme end of the travel thereof in either direction whereby the total volume of the condensation chamber and the expansion cylinder is tightly sealed closed only during those intervals while the movable piston means is at either extreme end of its travel in the minimum volume and maximum volume conditions.

2. A portable condensation nuclei meter according to claim 1 wherein the manually operable pump means comprises a hand operated reciprocal pump having first one way valving means for drawing a sample atmosphere through the expansion chamber into the pump during movement of the hand operated reciprocal pump piston in one direction and second one way valving means for opening an exhaust passage during the return stroke of the hand operated reciprocal pump.

3. A portable condensation nuclei meter according to claim 1 wherein the condensation chamber is supported within the manually portable housing within a second liquid tight housing containing a humidifying liquid, a wicking material surrounding the exterior surface of the condensation chamber and submerged within the humidifying liquid, suitable passageways formed in the otherwise liquid tight housing for drawing a sample of an atmosphere to be monitored into and through the humidifying chamber around the wicking material and thence to one end of the condensation chamber for suitably humidifying the sample atmosphere supplied to the condensation chamber at 100 percent relative humidity.

4. A portable condensation nuclei meter according to claim 1 wherein the manually operable valving means for isolating the condensation chamber during an expansion cycle comprises inlet and outlet ports formed on the condensation chamber, and manually actuable, cam operated coacting valving members for closing the respective inlet and outlet ports during the expansion period and opening the ports during the flushing period.

5. A portable condensation nuclei meter according to claim 1 wherein said measuring circuit means comprises a measure and hold measuring circuit for measuring pulsed electric signals produced by an electro-optic detector comprising a part of the electro-optic means, said measure and hold measuring circuit comprising a long term, constant current field effect transistor connected in series circuit relationship with the electro-optic detector across a pair of power supply terminals, said field effect transistor having long time constant resistor-capacitor network means coupled thereto for maintaining essentially long term constant current through the series circuit comprising the field effect transistor and electro-optic detector, a field effect transistor operational amplifier having a feedback circuit, first switching means for coupling the juncture of the field effect transistor and the electro-optic detector to the input of the field effect transistor operational amplifier, charge storing capacitor means, second switching means for connecting the output of the field effect transistor operational amplifier to the charge storing capacitor means for producing a charge therein proportional to the value of the input signal supplied to the input of the field effect transistor operational amplifier, said first and second switching means including additional means for disconnecting the charge storing capacitor means from the output of the field effect transistor operational amplifier and connecting the charge storing capacitor means to the input thereof, linear scale indicating meter movement means connected to the output of the field effect transistor operational amplifier for providing a linearly calibrated output indication of the magnitude of the output signal appearing at the output of the field effect transistor operational amplifier, said output indication being representative of the value of short term pulsed electric signals produced by the electro-optic detector and hence of the number of condensation nuclei particles being measured, and said field effect transistor operational amplifier having a high input impedance whereby the charge on the charge storing capacitor means can be held and an indication of the value thereof observed by a user of the instrument over comparatively long measuring time period.

6. A portable condensation nuclei meter according to claim 5 wherein the measure and hold measuring circuit means further includes third switching means connected to said charging storing capacitor means for selectively discharging said charge storing capacitor means intermediate each measurement operation of the condensation nuclei meter.

7. A portable condensation nuclei meter according to claim 6 further including scale range changing resistor means and fourth switching means for connecting said scale range changing resistor means into and out of the feedback circuit of the field effect transistor operational amplifier for changing the measurement scale of the instrument.

8. A portable condensation nuclei meter according to claim 7 wherein the measure and hold measuring circuit and the electro-optic means viewing the condensation chamber are battery operated, and the circuit further includes additional switching means connected in the energizing circuits for the field effect transistor operational amplifier for de-energizing the same during standby periods of non-use, and for energizing the operational amplifier only during actual measurement intervals.

9. A portable condensation nuclei meter according to claim 5 wherein the measure and hold measuring circuit means further includes third switching means connected to said charge storing capacitor means for selectively discharging said charge storing capacitor means intermediate each measurement operation of the condensation nuclei meter, scale range changing resistor means and fourth switching means for connecting said scale range changing resistor means into and out of the feedback circuit of the field effect transistor operational amplifier for changing the measurement scale of the instrument, and wherein the measure and hold measuring circuit and the electro-optic means viewing the condensation chamber are battery operated and the circuit further includes additional switching means connected in the energizing circuits for the field effect transistor operational amplifier for de-energizing the same during standby periods of non-use, and for energizing the operational amplifier only during actual measurement intervals.

10. A portable condensation nuclei meter according to claim 9 wherein the manually operable pump means comprises a hand operated reciprocal pump having first one way valving means for drawing a sample atmosphere through the expansion chamber into the pump during movement of the hand operated reciprocal pump piston in one direction and second one way valving means opening an exhaust passage during the return stroke of the hand operated reciprocal pump, the condensation chamber is supported within the manually portable housing within a second liquid tight housing containing a humidifying liquid, a wicking material surrounding the exterior surface of the condensation chamber and submerged within the humidifying liquid, and suitable passageways formed in the otherwise liquid tight chamber for drawing a sample of an atmosphere to be monitored through the humidifying chamber up around the wicking material and thence to one end of the condensation chamber for suitably humidifying the sample atmosphere supplied to the condensation chamber at 100% relative humidity, and wherein the manually operable valving means for isolating the condensation chamber during an expansion cycle comprises inlet and outlet ports formed on the condensation chamber, and manually actuable, cam operated coacting valving means for closing the respective inlet and outlet ports during the expansion period and opening the ports during the flushing period.

11. A method of operating a portable condensation nuclei meter according to claim 10 wherein all of the switching means in the measure and hold measuring circuit are cam operated from a common, manually actuable cam shaft that also drives the cam actuated expansion valve means together with the cam operated valving means opening and closing the inlet and outlet ports to the condensation chamber, the respective cams being arrayed on the common, manually actuable cam drive shaft in a manner such that operating positions identified as STANDBY, FLUSH, ZERO, ADJUST, EXPAND and READ are provided, and wherein; in the STANDBY position the cams adjust the valving means to the condensation chamber to their open position, while maintaining the field effect transistor operational amplifier in its de-energized state through appropriate actuation of the additional switching means, the third switching means is closed to discharge the charge storing capacitor means, and the first and second switching means are closed to connect the charge storing capacitor means in the output of the field effect transistor amplifier, in the FLUSH position the field effect transistor operational amplifier is energized through the additional switching means and the instrument is conditioned to allow the pumping means to be actuated and flush into the condensation chamber a sample of the atmosphere to be monitored; with the common cam shaft in the ZERO ADJUST position the inlet and outlet valves to the condensation chamber are closed, the third switching means across the charge storing capacitor is opened, the field effect transistor operational amplifier is energized by the additional switching means and the movable piston in the expansion means is cocked against its return bias spring; in the EXPAND position, the movable piston member in the expansion valving means is released and spring driven to its maximum volume setting so as to expand the volume of the combined expansion chamber and expansion means on the order of 20 percent and form a cloud of droplets in the expansion chamber and the charge storing capacitor means is charged to a value representative of the number of nuclei particles; and finally in the READ position of the common cam shaft, the field effect transistor operational amplifier is conditioned to read the charge stored in the charge storing capacitor means to provide an output indication of the value of the charge and hence of the number of the condensation nuclei particles being measured on the linear scale indicating meter movement whereupon the instrument may be returned to STANDBY and a new measurement cycle initiated.

* * * * *